Feb. 20, 1962     R. A. SHERIDAN     3,021,635
ARTIFICIAL WAKE FOR DUCK DECOY
Filed April 17, 1959
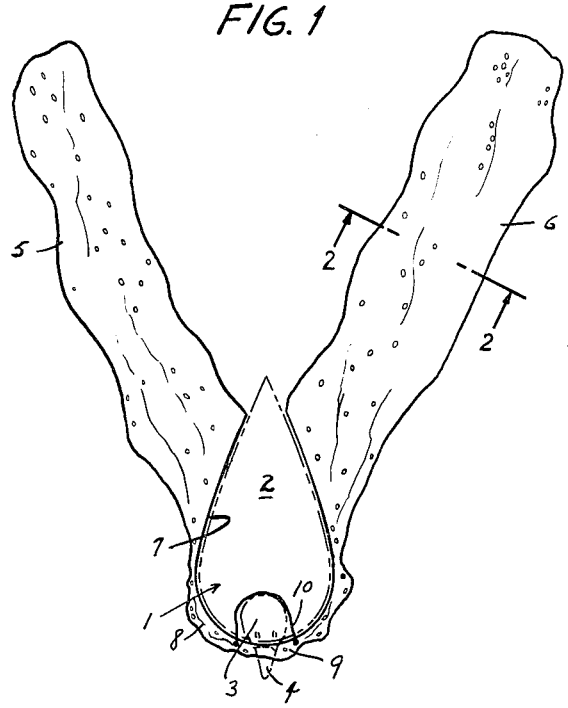
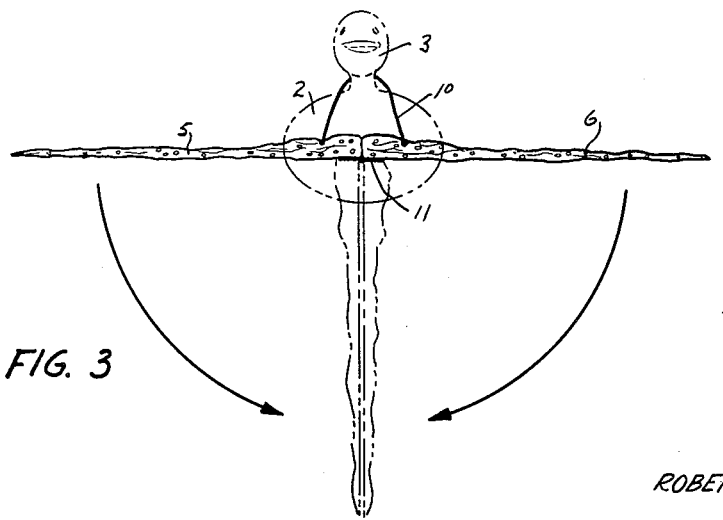
INVENTOR.
ROBERT A. SHERIDAN
BY
ATTORNEY

United States Patent Office 3,021,635
Patented Feb. 20, 1962

3,021,635
ARTIFICIAL WAKE FOR DUCK DECOY
Robert Anthony Sheridan, 3 Brooklands,
Bronxville, N.Y.
Filed Apr. 17, 1959, Ser. No. 807,100
3 Claims. (Cl. 43—3)

This invention relates to duck decoys, and more particularly to an artificial, simulated wake which may be easily attached to the decoy for giving the decoy an appearance of motion.

As is well known to the duck hunter, considerable effort has been made to improve the construction and appearance of decoys, blinds and other related equipment to beguile the bird into coming within firing range. The manufacture of duck decoys has advanced to the stage where the decoy is almost life-like in proportions and color.

Although the duck decoy in itself appears like the real bird, the decoy is usually motionless in the water, unless some means is provided for moving the decoy. Usually the time for best hunting is about dawn, when the atmosphere is comparatively still and the water almost glasslike in appearance. Of course, the placing of a decoy in such water produces no wake or evidence of life-like motion. The bird, as well known to the hunter, possesses almost uncanny instincts for distinguishing between the artificial decoy and the read bird of a feather. It is also known to the hunter that a motionless decoy is not likely to interest the flying bird to approach for companionship. Duck hunters, therefore, have devised rather complicated mechanisms for moving the decoy while it is floating in the water. Probably the most common mechanism comprises a rigging from the blind to the front of the decoy, whereby the decoy may be pulled toward the blind along the surface of the water. However, such rigging is unsatisfactory in many respects. The rigging requires installation on the water bed and occasionally the line is tangled by floating debris. Further, particular care must be exercised not to pull the decoy under by excessive taking-up of the rigging. Generally speaking, the known mechanisms for motivating the decoy are complicated, inconvenient and somewhat expensive.

Accordingly, it is an object of this invention to provide an artificial, simulated wake which may be easily attached to the decoy and which gives the decoy an appearance of motion.

It is a feature of this invention to provide an artificial wake which is readily attachable to and detachable from the decoy.

It is a further feature of this invention to provide an artificial wake which may be folded for ease in transportation and packaging.

In accordance with an aspect of the invention, there is provided an artificial wake for a duck decoy loosely attached to the decoy and sufficiently buoyant to float on the surface of the water.

The above-mentioned and other features and objects of this invention and the manner of attaining them will become more apparent and the invention itself will be best understood by reference to the following description of an embodiment of the invention taken in conjunction with the accompanying drawing, wherein:

FIGURE 1 is a top view of a decoy and artificial wake;
FIGURE 2 is a sectional view taken along lines 2—2 of FIGURE 1; and
FIGURE 3 is a front view of the simulated wake showing the wake in an operating and folded position.

Referring now to the figures, the decoy is shown at 1, comprising the usual body portion 2, head 3 and bill 4.

The artificial, simulated wake is generally in the form of a U with wing-shaped wake portions 5, 6 extending from the rear portions of the U in the direction of a trailing wake. The inside surface 7 of the U portion conforms to the body of the decoy at the waterline thereof. The part of the U extending outwardly from the inside surface thereof, 8, is generally in the shape of a wake caused by a relatively slow-moving bird. Of course, the bridge 9 of the U, which is located in front of the decoy, is in the shape of the forward wake. This is illustrated generally in the figures.

Preferably, the inside dimensions of the U are selected so that the artificial wake fits loosely around the bird, and is secured to the bird by means of a plastic line 10, which may be secured by snap fasteners, or otherwise, to the forward portion of the wake, as shown in FIGURES 1 and 3.

The artificial wake is preferably made of a plastic, such as polyethylene, which is durable, colorable and which is sufficiently buoyant to float on the surface of the water. The floating capability of the wake is an important feature of the invention, permitting the wake to be constantly present on the surface of the water, irrespective of the bobbing of the decoy.

The artificial wake, of course, is fabricated so as to simulate the actual wake as accurately as possible, and includes ripples and bubbles in size and amount ordinarily found in the actual wake.

The trailing wakes are preferably integral with the U-shaped member and are about twice the length of the decoy. The ripples and air bubbles toward the ends of the trailing wake are of gradually diminishing intensity.

Generally, there are two sizes of decoys, life-size and over-size. If desired, two sizes of artificial wakes may also be fabricated. However, I prefer to use only one size, which is a minor compromise for the decoys of the different sizes. To accommodate the different sizes, the U-shaped portion is simply made of suitable dimensions for the over-size decoy, which would be slightly large for the life-size decoy.

The preferred embodiment of the artificial wake comprises a hinge 11 located at the front thereof, whereby the two halves may be folded downwardly for ease in transportation and packaging.

If desired, each of the discharge wakes 5 and 6 may also be hinged to the U-portion.

Once the concept of an artificial wake has been realized, expedients for securing the wake to the decoy will become obvious to those skilled in the art. For example, instead of the wake fitting loosely around the decoy, the U-shaped portion may be in the form of a resilient band and clasping the decoy body. In this arrangement, the wake serves as a pontoon and prevents the decoy from bobbing so as to submerge the wake. Alternatively, the wake may be perforated so as to become submerged to follow the bobbing of the decoy above and below the surface of the water.

While the foregoing description sets forth the principles of the invention in connection with a specific device, it is to be clearly understood that this description is made only by way of example and not as a limitation of the scope of the invention as set forth in the objects thereof and in the accompanying claims.

I claim:

1. An artificial wake for a duck decoy having a body portion, comprising a U-shaped member adapted to fit around the body portion of the decoy along the waterline thereof, and a relatively flat elongated member extending from the rear of the U-shaped member simulating a trailing wake, the U-shaped and trailing wake members comprising buoyant material whereby the artificial wake floats on the surface of the water.

2. The wake according to claim 1, wherein said U-shaped and trailing wake members are dimensioned to fit loosely around said decoy and are capable of independent bobbing in the water.

3. An artificial wake according to claim 1, and further comprising a hinged portion located at the bridge of said U-shaped member whereby the artificial wake may be folded in half.

References Cited in the file of this patent

UNITED STATES PATENTS

| | | |
|---|---|---|
| 694,732 | Coudon | Mar. 4, 1902 |
| 1,589,065 | Gere et al. | June 15, 1926 |
| 1,613,941 | Churus | Jan. 11, 1927 |
| 2,680,921 | Gowland | June 15, 1954 |
| 2,747,316 | Benedetto | May 29, 1956 |

FOREIGN PATENTS

| | | |
|---|---|---|
| 466,774 | Canada | July 25, 1950 |